(12) United States Patent
Lingala et al.

(10) Patent No.: US 11,532,218 B2
(45) Date of Patent: Dec. 20, 2022

(54) DETECTION OF UNAUTHORIZED ACCESS OF LOCKED CONTAINER

(71) Applicant: CARRIER CORPORATION, Palm Beach Gardens, FL (US)

(72) Inventors: Ramesh Lingala, Telangana (IN); Biswaranjan Pattanaik, Telangana (IN); Adam Kuenzi, Salem, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/973,318

(22) PCT Filed: Dec. 12, 2019

(86) PCT No.: PCT/US2019/066021
§ 371 (c)(1),
(2) Date: Dec. 8, 2020

(87) PCT Pub. No.: WO2020/131572
PCT Pub. Date: Jun. 25, 2020

(65) Prior Publication Data
US 2021/0366252 A1    Nov. 25, 2021

(30) Foreign Application Priority Data

Dec. 20, 2018    (IN) .............................. 201811048406

(51) Int. Cl.
*G08B 13/14*    (2006.01)
*G07C 9/00*    (2020.01)
*G08B 13/196*    (2006.01)
*E05B 19/00*    (2006.01)

(52) U.S. Cl.
CPC ...... *G08B 13/1436* (2013.01); *E05B 19/0005* (2013.01); *G07C 9/00896* (2013.01); *G08B 13/19647* (2013.01); *G07C 2009/00936* (2013.01)

(58) Field of Classification Search
CPC ............ E05B 19/0005; G07C 9/00896; G07C 2009/00936; G08B 13/19647
See application file for complete search history.

(56) References Cited

U.S. PATENT DOCUMENTS

| 5,635,693 A | 6/1997 | Benson et al. |
| 6,002,326 A | 12/1999 | Turner |
| 6,628,008 B2 | 9/2003 | Steinmueller et al. |
| 7,317,393 B2 | 1/2008 | Maloney |

(Continued)

FOREIGN PATENT DOCUMENTS

WO    2018127354 A1    7/2018

OTHER PUBLICATIONS

International Search Report issued in Application No. PCT/US2019/066021 dated Mar. 16, 2020, 6 pages.

(Continued)

*Primary Examiner* — Daniell L Negron
(74) *Attorney, Agent, or Firm* — Cantor Colburn LLP

(57) ABSTRACT

Detecting unauthorized access of a locked key container having a key for a vehicle or a premises. An indication is received at a sensor coupled to the key that the key container is being tampered with. A notification is sent in response to receiving the indication that the key container is being tampered with.

20 Claims, 4 Drawing Sheets

(56) References Cited

U.S. PATENT DOCUMENTS

| | | |
|---|---|---|
| 7,760,091 B2 | 7/2010 | Comerford |
| 7,965,190 B2 | 6/2011 | Maloney |
| 8,171,129 B2 | 5/2012 | Hsieh et al. |
| 8,610,574 B2 | 12/2013 | Kestenbaum |
| 8,831,970 B2 | 9/2014 | Weik, III et al. |
| 9,033,116 B2 * | 5/2015 | Breed .................... G08B 13/00 340/568.1 |
| 9,734,694 B2 | 8/2017 | Li |
| 2001/0004235 A1 | 6/2001 | Maloney |
| 2002/0128769 A1 | 9/2002 | Der Ghazarian et al. |
| 2007/0090921 A1 | 4/2007 | Fisher |
| 2007/0260554 A1 | 11/2007 | Marui et al. |
| 2009/0167488 A1 | 7/2009 | Hays et al. |
| 2014/0334684 A1 | 11/2014 | Strimling |
| 2018/0154867 A1 | 6/2018 | Golduber |
| 2018/0247505 A1 | 8/2018 | Arai et al. |

OTHER PUBLICATIONS

Written Opinion issued in Application No. PCT/US2019/066021 dated Mar. 16, 2020, 9 pages.

* cited by examiner

DETECTION OF UNAUTHORIZED ACCESS OF LOCKED CONTAINER

CROSS REFERENCE TO RELATED APPLICATIONS

This application claims the benefit of IN Application No. 201811048406, filed on Dec. 20, 2018, which is incorporated herein by reference in its entirety

BACKGROUND

The embodiments herein generally relate to lock boxes for keys, and more particularly, to detecting unauthorized access to the lock boxes.

Key are still used today to unlock locks to vehicles and to then start the vehicles. Sometimes, in an automotive sales environment, the keys to a particular vehicle are kept inside a locked key box or key container attached to the outside of the vehicle. In order to gain access to the keys, the sales persons must first open the key container. However, in a vehicle lot there is sometimes a chance someone could steal a vehicle by taking the keys from the key container. What is needed is a way to detect unauthorized access to key containers.

SUMMARY

According to a non-limiting embodiment, a method for detecting unauthorized access of a locked key container is provided. The method includes locking a key inside a key container and receiving an indication at a sensor that the key container is being tampered with, wherein the sensor is coupled to the key inside the key container. The method also includes sending a notification in response to receiving the indication that the key container is being tampered with. In one or more embodiments, the key is to a particular vehicle and the key container is located on or near the particular vehicle.

In addition to one or more of the features described herein, or as an alternative, further embodiments of the method may include wherein receiving an indication at a sensor that the key container is being tampered with includes receiving an indication of motion at a motion sensor that the key container is being tampered with.

In addition to one or more of the features described herein, or as an alternative, further embodiments of the method may include wherein the indication of motion includes cutting of the key container.

In addition to one or more of the features described herein, or as an alternative, further embodiments of the method may include wherein the indication of motion includes cutting of a lock to the key container.

In addition to one or more of the features described herein, or as an alternative, further embodiments of the method may include wherein sending a notification in response to receiving the indication that the key container is being tampered with includes sending an alert to central service.

In addition to one or more of the features described herein, or as an alternative, further embodiments of the method may include wherein sending a notification in response to receiving the indication that the key container is being tampered with includes sending an alert to an owner of the vehicle.

In addition to one or more of the features described herein, or as an alternative, further embodiments of the method may include, in response to receiving an indication at a sensor that the key container is being tampered with, transmitting video of the key container being tampered with.

In addition to one or more of the features described herein, or as an alternative, further embodiments of the method may include determining a direction of a signal and orienting a video camera based on the direction of the signal.

In addition to one or more of the features described herein, or as an alternative, further embodiments of the method may include determining a time-of-flight of a signal, thereby determining a distance to the key container being tampered with.

In addition to one or more of the features described herein, or as an alternative, further embodiments of the method may include wherein sending a notification in response to receiving the indication that the key container is being tampered with includes sending a video evidencing that the key container is being tampered with.

According to another non-limiting embodiment, a system for detecting unauthorized access of a locked key container is provided. The system includes a key locked in a key container and a sensor coupled to the key within the key container. The system also includes generating an indication at the sensor that the key container is being tampered with and a notification generated in response to receiving the indication that the key container is being tamped with.

In addition to one or more of the features described herein, or as an alternative, further embodiments of the system may include wherein the key is to a particular vehicle and the key container is located on or near the particular vehicle.

In addition to one or more of the features described herein, or as an alternative, further embodiments of the system may include wherein the sensor is a motion sensor receiving the indication that the key container is being tampered with.

In addition to one or more of the features described herein, or as an alternative, further embodiments of the system may include a computing device receiving the notification and the computing device providing an alert to at least one of the following: an owner of the vehicle, a manager of a sales lot, a sales associate of a sales lot, a security guard, and a police department.

In addition to one or more of the features described herein, or as an alternative, further embodiments of the system may include a video of the key container being tampered with.

In addition to one or more of the features described herein, or as an alternative, further embodiments of the system may include a video camera oriented based on a direction of a signal from the sensor and on a time-of-flight of the signal from the sensor.

According to another embodiment, a computer program product including a computer readable storage medium having program instructions embodied therewith, the program instructions executable by a computer processor to cause the computer processor to perform a method for detecting unauthorized access of a locked key container, comprising: receiving an indication at a sensor that a key container located on or near a particular vehicle is being tampered with, wherein the sensor is coupled to a key to the particular vehicle inside the key container; and receiving a notification in response to the indication that the key container is being tampered with.

In addition to one or more of the features described herein, or as an alternative, further embodiments of the computer program product may include wherein receiving an indication from a sensor that a key container located on or near a particular vehicle is being tampered with includes receiving an indication of motion from a motion sensor that the key container is being tampered with, and wherein receiving a notification in response to the indication that the key container is being tampered with includes sending an alert to at least one of the following: an owner of the vehicle, a manager of a sales lot, a sales associate of a sales lot, a security guard, and a police department.

In addition to one or more of the features described herein, or as an alternative, further embodiments of the computer program product may include, in response to receiving an indication from a sensor that a key container located on or near a particular vehicle is being tampered with, transmitting video of the key container being tampered with.

In addition to one or more of the features described herein, or as an alternative, further embodiments of the computer program product may include determining a direction of a signal from the sensor in order to orient a video camera based on the direction of the signal and determining a time-of-flight of the signal from the sensor, thereby determining a distance to the key container being tampered with.

Additional features and advantages are realized through the techniques of the disclosure. For a better understanding of the disclosure with the advantages and the features, refer to the description and to the drawings.

BRIEF DESCRIPTION OF THE DRAWINGS

The foregoing and other features, and advantages of the disclosure are apparent from the following detailed description taken in conjunction with the accompanying drawings, in which.

Figure 1:
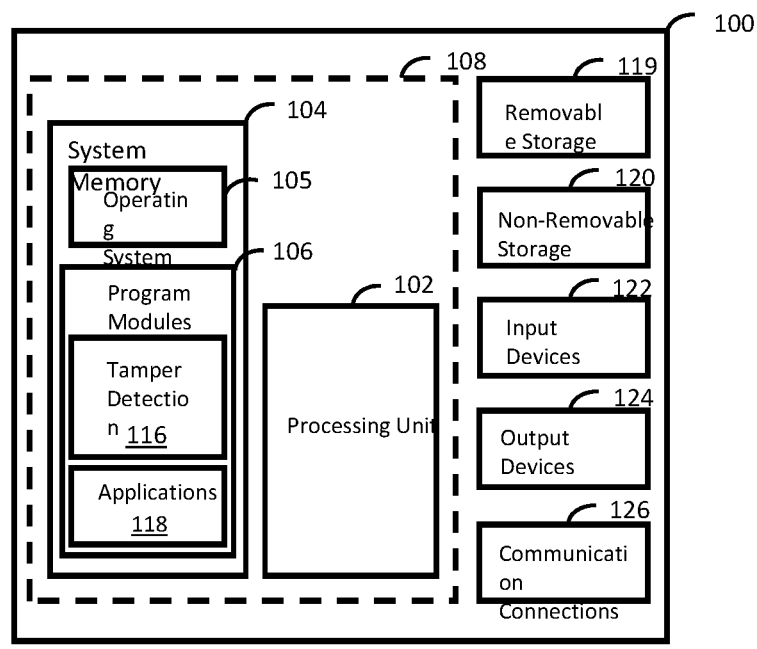
FIG. 1 depicts a block diagram illustrating an exemplary computing device that may be utilized to implement exemplary embodiments of the present disclosure.

The diagrams depicted herein are illustrative. There can be many variations to the diagram or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the disclosure are described herein with reference to the related drawings. Alternative embodiments of the disclosure can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the disclosure may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment illustrating physical components (i.e., hardware) of a processing system, commonly referred to as a computing device or computing system 100, for implementing the teachings herein. However, FIG. 1 is for purposes of example and illustration and are not limiting of the vast number of computing device configurations that are utilized for practicing aspects of the disclosure. In a basic configuration, the computing device 100 includes at least one processing unit 102 and a system memory 104. According to an aspect, depending on the configuration and type of computing device, the system memory 104 comprises, but is not limited to, volatile storage (e.g., random access memory), non-volatile storage (e.g., read-only memory), flash memory, or any combination of such memories. According to an aspect, the system memory 104 includes an operating system 105 and one or more program modules 106 suitable for running software applications 118. According to an aspect, the system memory 104 includes a tamper detection module 116. The operating system 105, for example, is suitable for controlling the operation of the computing device 100.

Furthermore, aspects are practiced in conjunction with a graphics library, other operating systems, or any other application program, and is not limited to any particular application or system. This basic configuration is illustrated in FIG. 1 by those components within a dashed line 108. According to an aspect, the computing device 100 has additional features or functionality. For example, according to an aspect, the computing device 100 includes additional data storage devices (removable and/or non-removable) such as, for example, magnetic disks, optical disks, or tape. Such additional storage is illustrated in FIG. 1 by a removable storage device 119 and a non-removable storage device 120.

As stated above, according to an aspect, a number of program modules and data files are stored in the system memory 104. While executing on the processing unit 102, the program modules 106 (e.g., tamper detection 116) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, and the like.

According to an aspect, the computing device 100 has one or more input device(s) 122 such as a keyboard, a mouse, a pen, a sound input device, a touch input device, etc. The output device(s) 124 such as a display, speakers, a printer, etc. are also included according to an aspect. The aforementioned devices are examples and others may be used. According to an aspect, the computing device 100 includes one or more communication connections 126 allowing communications with other computing devices. Examples of suitable communication connections 126 include, but are not limited to, radio frequency (RF) transmitter, receiver, and/or transceiver circuitry; universal serial bus (USB), parallel, and/or serial ports.

Figure 2:
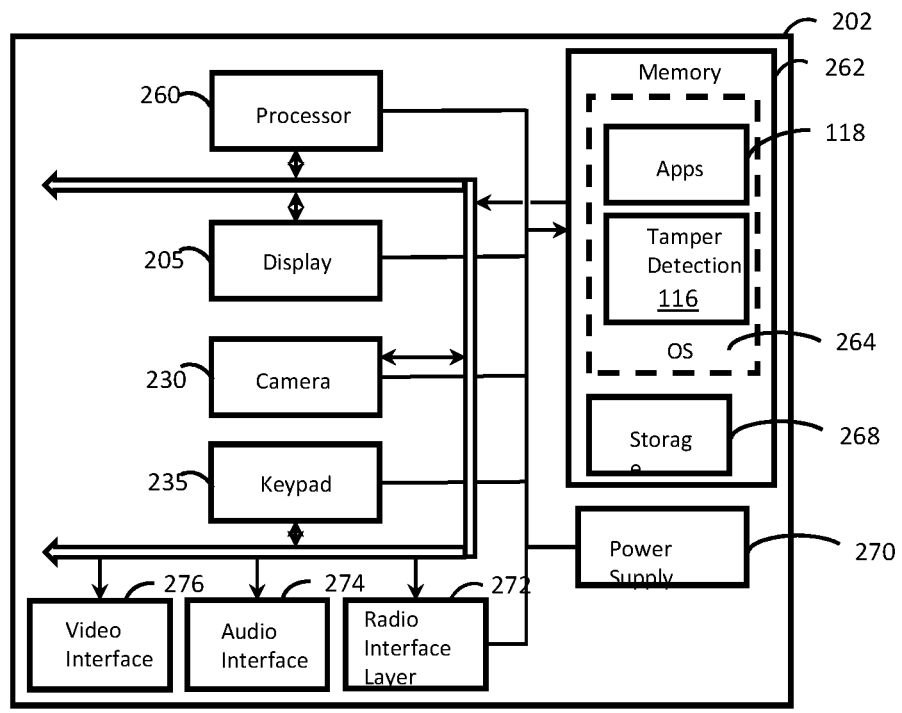
FIG. 2 depicts a block diagram illustrating components of an exemplary mobile computing device that may be utilized to implement exemplary embodiments of the present disclosure.

FIG. 2 is a block diagram illustrating the architecture of one example of a mobile computing device 202. In one example, the mobile computing device 202 is implemented as a "smart phone" capable of running one or more applications (e.g., browser, e-mail, calendaring, contact managers, messaging clients, games, and media clients/players). In some examples, the mobile computing device 202 is integrated as a mobile computing device, such as an integrated personal digital assistant (PDA) and wireless phone.

In a basic configuration, the mobile computing device 202 is a handheld computer having both input elements and output elements. The mobile computing device 202 typically includes a display 205 and one or more input or home buttons that allow the user to navigate information and between an application on the mobile computing device 202. According to an aspect, the display 205 of the mobile computing device 202 functions as an input device (e.g., a touchscreen display). In alternative examples, mobile computing device 202 incorporates more or less input elements. The mobile computing device 202 may also include a keypad 235 such as a soft keypad generated via the display 205. According to an aspect, the optional keypad may be a physical keypad. Also, in one or more embodiments, the mobile computing device may include a camera 230.

According to an aspect, one or more application programs 118 are loaded into the memory 262 and run on or in association with the operating system 264. Examples of application programs include phone dialer programs, e-mail programs, personal information management (PIM) programs, word processing programs, spreadsheet programs, Internet browser programs, messaging programs, and so forth. According to an aspect, the application for tamper detection 116 is loaded into memory 262. The mobile computing device 202 also includes a non-volatile storage area 268 within the memory 262. The non-volatile storage area 268 is used to store persistent information that should not be lost if the computing device 202 is powered down. The application programs 118 may use and store information in the non-volatile storage area 268, such as e-mail or other messages used by an e-mail application, and the like. A synchronization application (not shown) also resides on the mobile computing device 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 202. In one or more embodiments, the host computer may be one or more resources hosted in a cloud environments such as the Internet.

According to an aspect, the mobile computing device 202 has a power supply 270, which is implemented as one or more batteries. According to an aspect, the power supply 270 further includes an external power source, such as an AC adapter or a powered docking cradle that supplements or recharges the batteries.

According to an aspect, the mobile computing device 202 includes a radio 272 that performs the function of transmitting and receiving radio frequency communications. The radio 272 facilitates wireless connectivity between the mobile computing device 202 and the "outside world," via a communications carrier or service provider. Transmissions to and from the radio 272 are conducted under control of the operating system 264. In other words, communications received by the radio 272 may be disseminated to the application programs 118 via the operating system 264, and vice versa.

These devices may be directly coupled to the power supply 270 so that when activated, they remain on for a duration dictated by the notification mechanism even though the processor 260 and other components might shut down for conserving battery power. The audio interface 274 is used to provide audible signals to and receive audible signals from the user. For example, the audio interface 274 may also be coupled to a microphone to receive audible input such as to facilitate a telephone conversation. According to an aspect, the mobile computing device 202 further includes a video interface 276 that enables an operation of the on-board camera 230 to record still images, video stream, and the like.

Figure 3:
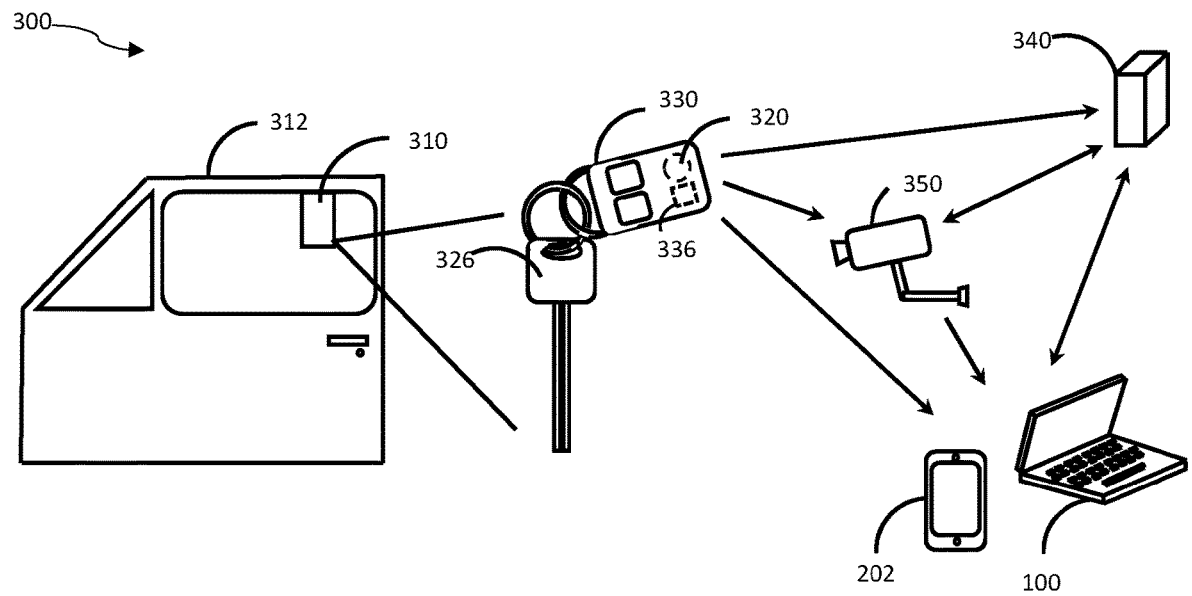
FIG. 3 depicts an exemplary environment with a detection system for detecting unauthorized access to a key container according to exemplary embodiments of the present disclosure.

The present disclosure may be a system, a method, and/or a computer program product. FIG. 3 depicts an exemplary vehicle sales environment utilizing a detection system 300 for detecting unauthorized access to a key container 310 located on or near a vehicle 312. The key container 310 may be any type of container with a securable interior configured for receiving and retaining a key 326 and receiving and retaining a sensor 320 along with the key 326. In one or more embodiments, the key container 310 is a key container referred to as a supra key advantage key box.

The detection system 300 includes a sensor such as a motion sensor (or motion detector) 320 coupled or attached to a key 326 via a key ring, for example. The motion sensor 320 is preferably a vibration motion sensor suitable for detecting cutting or banging on the key container 310 or cutting or banging on a lock to the key container 310. The motion sensor may also be coupled with a controller that manages the motion sensor 320. The controller may decide when the amount of movement or vibration detected by the motion sensor 320 exceeds a threshold and then transmit vibration data from a transmitter 336. The transmitter 336 may be a short-range transmitter such, for example, Bluetooth or Zigbee, or a long-range transmitter such as, for example, LoRA, SigFox, or Sub-gig. The transmitter could also be cellular or satellite. In one or more embodiments, the motion sensor 320 may be an accelerometer.

The key 326 may be a mechanical or electrical key. For example, the key 326 to access the vehicle 312 may be a physical mechanical key, an electro/mechanical key, an electronic FOB used to control access, a RFID access card, a USB token, or the like. FIG. 3 depicts a mechanical key 326 along with a separate key FOB 330 having the sensor 320. Alternatively, the key 326 may be just the key FOB 330 itself with the sensor 320. The key FOB 330 may be powered by a cell battery and also have a controller with part of or a component of tamper detection module 116 in order to transmit a notification message.

In any case, the key 326 and motion sensor 320 can be placed into the interior of the key container 310 when access to the vehicle 312 is not needed. Preferably, the motion sensor 320 only functions when placed inside the key container 310 or when the key container 310 is locked. For example, the motion sensor 320 or another sensor such as, for example, a proximity sensor can detect that it is inside the key container 310 or, alternatively, the transmitter 336 or a receiver receives a signal from the motion sensor 310 that it is inside the key container 310 and that the key container is locked. When the key container 310 is opened the motion sensor 320 could signal the transmitter 336 that the key container 310 was opened so that the motion sensor 310 can then change sensitivity levels to a lower sensitivity or go into a sleep mode in order to avoid generating a false alarm. Alternatively, the sensor 310 could be selective for a certain type of event such as cutting, sawing or banging and other events could be ignored so that there is no need to turn the sensor 310 on or off.

Upon the motion sensor 320 detecting cutting or banging, vibration data is transmitted from the transmitter 336. In one or more embodiments, the motion sensor 320 and the transmitter 336 are combined into the same electrical component. The vibration data may be transmitted and, therefore referred to as a notification, to one or more of the computing devices 100, 202, and/or a local server 340, having the tamper detection module 116, for receiving the notification and interpreting the vibration data. In one or more embodiments, this could be a Bluetooth signal to one or more mobile phones such as mobile computing device 202. In one or more other embodiments, this may be a long-range transmission to a receiver that can pass or relay the notification to the computing devices 100, 202 or local server 340 which could then send a notification to the another computing device 100, 202 of an owner or a manager, sales associate or security guard of the vehicle lot or of a building or some other premises.

The tamper detection module 116 may generate and display an alert and/or send an alert from one or more of the computing devices 100, 202, and local server 340. The tamper detection 116 may also direct an alarm system, such as a vehicle's alarm system or an alarm system of a premises on a vehicle sales lot, to sound an alarm such as a siren and, or a call to a call center responsible for monitoring alarm systems. Also, the computing devices 100, 202 or the local server 340 may process received data and events to determine whether there is a false alarm. For example, if there is an earthquake and multiple alerts are received at approximately the same time then the computing devices 100, 202 or local server 340 could decide to take no action. The alert may be received by the owner of the vehicle 312 or, for example, a manager, sales associates, or a security guard of a sales lot. Also, the alert may be received at other computing devices or at a central service that performs monitoring for one or more detection systems 300. The central service may then issue one or more alerts based on the vibration data of one or more detection systems 300.

In one or more embodiments, the detection system 300 may also include a video camera 350. The video camera is preferably positioned overlooking one or more vehicles 312 having key containers 310. The video camera 350 itself could receive a signal from the transmitter 336 to determine a direction and orient the video camera 350 based on the direction of the signal at a particular vehicle 312 or, alternatively, the local computing device 100, 202 or the server 340 can control the orientation of the video camera 350 in response to a signal from the transmitter 336. The signal can also be used for determining a time-of-flight and angle of arrival thereby determining a distance to and a position of the key container 310 being tampered with.

The video camera 350 can transmit video of a key container 310 being tampered with in response to the motion sensor 320 detecting that the key container 310 is being tampered with. In such case, the video from the video camera 350 can serve as the notification indicating the key container 310 is being tampered with or the video evidencing that the key container 310 is being tampered with can be included as verification of the received vibration data. In one or more embodiments, the video can be user or analyzed by a central monitoring service to confirm the occurrence of a particular event in order to trigger one or more responses such as calling the police, turning on an alarm or a siren, notifying a manager/owner, notifying a sales associate, notifying a security guard, and/or locking down a facility, lot or premises.

Figure 4:
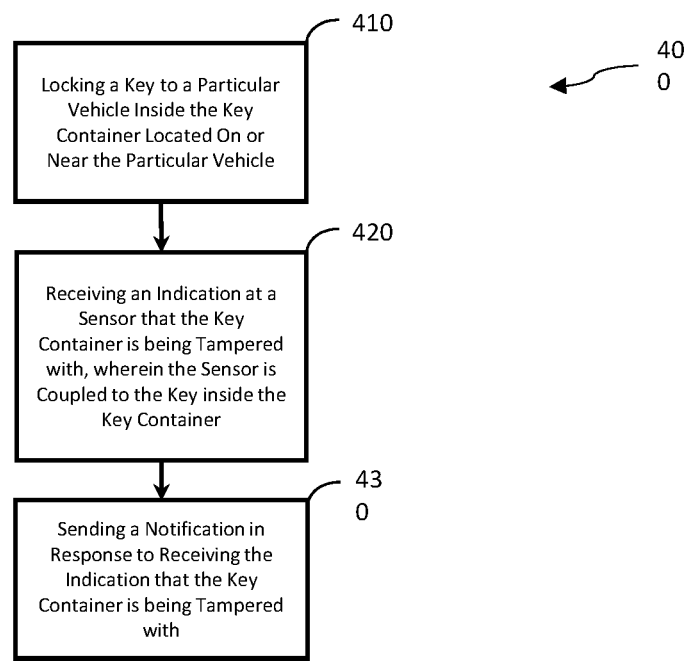
FIG. 4 is a flow diagram illustrating a method for detecting unauthorized access of a locked key container according to exemplary embodiments of the present disclosure.

Turning to FIG. 4, one or more embodiments may include a method 400 for detecting unauthorized access of a locked key container. The flow diagram of FIG. 4 illustrates the method 400 that includes process block 410 for locking a key to a particular vehicle inside the key container located on or near the particular vehicle. The method 400 also includes process block 420 for receiving an indication at a sensor that the key container is being tampered with, wherein the sensor is coupled to the key inside the key container. In one or more embodiments, an indication of motion is received at a motion sensor that the key container is being tampered with. For example, the indication of motion can be cutting or banging on the key container or cutting or banging on a lock to the key container. The method 400 then includes process block 430 for sending a notification in response to receiving the indication that the key container is being tampered with. In one or more embodiments, for example, an alert is sent to a central service or sent to an owner of the vehicle. The notification may also include a video evidencing that the key container is being tampered with.

The method 400 may also include transmitting video of the key container being tampered with in response to receiving an indication at a sensor that the key container is being tampered with. The method 400 may also include determining a direction of a signal and orienting a video camera based on the direction of the signal. For example, the video camera would be pointed in the direction of the key container that is being tampered with. The method 400 may also include determining a time-of-flight of a signal in order to determine the distance to the key container that is being tampered with.

Various technical benefits are achieved using the system and methods described herein, including the capability of providing enhanced performance for applications with exclusive access to the co-processors while also allowing applications that do not need performance access to accelerators when shared access is available. In this manner, the computing device can realize performance gains through the use of co-processors in the system, thereby improving overall processing speeds.

The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting unauthorized access of a locked key container, the method comprising:
    locking a key to a key container;
    receiving an indication at a sensor that the key container is being tampered with, wherein the sensor is coupled to the key inside the key container; and
    sending a notification in response to receiving the indication that the key container is being tampered with;
    wherein upon the key container being unlocked and opened and the key removed from the key container, the sensor reducing sensitivity level to avoid generating a false alarm.

2. The method of claim 1 wherein the key is to a particular vehicle and the key container is located on or near the particular vehicle, and wherein receiving an indication at a sensor that the key container is being tampered with comprises receiving an indication of motion at a motion sensor that the key container is being tampered with.

3. The method of claim 2 wherein the indication of motion comprises cutting of the key container.

4. The method of claim 2 wherein the indication of motion comprises cutting of a lock to the key container.

5. The method of claim 1 wherein sending a notification in response to receiving the indication that the key container is being tampered with comprises sending an alert to central service.

6. The method of claim 1 wherein sending a notification in response to receiving the indication that the key container is being tampered with comprises sending an alert to one or more of the following:
    an owner of a vehicle;
    a manager of a sales lot;
    a sales associate of a sales lot;
    a security guard; and
    a police department.

7. The method of claim 1 further comprising, in response to receiving an indication at a sensor that the key container is being tampered with, transmitting video of the key container being tampered with.

8. The method of claim 7 further comprising determining a direction of a signal and orienting a video camera based on the direction of the signal.

9. The method of claim 7 further comprising determining a time-of-flight of a signal, thereby determining a distance to the key container being tampered with.

10. The method of claim 1 wherein sending a notification in response to receiving the indication that the key container is being tampered with comprises sending a video evidencing that the key container is being tampered with.

11. A system for detecting unauthorized access of a locked key container, the system comprising:
    a key locked in a key container;
    a sensor coupled to the key within the key container;
    an indication at the sensor that the key container is being tampered with; and
    a notification generated in response to receiving the indication that the key container is being tamped with;
    wherein upon the key container being unlocked and opened and the key removed from the key container, the sensor reducing sensitivity level to avoid generating a false alarm.

12. The system of claim 11 wherein the key is to a particular vehicle and the key container is located on or near the particular vehicle.

13. The system of claim 11 wherein the sensor is a motion sensor receiving the indication that the key container is being tampered with.

14. The system of claim 11 further comprising a computing device receiving the notification and the computing system providing an alert to at least one of the following:
    an owner of a vehicle;
    a manager of a sales lot;
    a sales associate of a sales lot;
    a security guard; and
    a police department.

15. The system of claim 11 further comprising a video of the key container being tampered with.

16. The system of claim 11 further comprising a video camera oriented based on a direction of a signal from the sensor and on a time-of-flight of the signal from the sensor.

17. A computer program product comprising a computer readable storage medium having program instructions embodied therewith, the program instructions executable by a computer processor to cause the computer processor to perform a method for detecting unauthorized access of a locked key container, comprising:
    receiving an indication at a sensor that a key container is being tampered with, wherein the sensor is coupled to a key inside the key container; and
    receiving a notification in response to the indication that the key container is being tampered with;
    wherein upon the key container being unlocked and opened and the key removed from the key container, the sensor reducing sensitivity level to avoid generating a false alarm.

18. The computer program product of claim 17 wherein receiving an indication from a sensor that a key container is being tampered with comprises receiving an indication of motion from a motion sensor that the key container is being tampered with, and wherein in response to receiving the notification an alert is sent to one or more of the following:
    an owner of a vehicle;

a manager of a sales lot;
a sales associate of a sales lot;
a security guard; and
a police department.

19. The computer program product of claim 17 wherein the method further comprises, in response to receiving an indication from a sensor that a key container is being tampered with, transmitting video of the key container being tampered with.

20. The computer program product of claim 17 wherein the method further comprises determining a direction of a signal from the sensor in order to orient a video camera based on the direction of the signal and determining a time-of-flight of the signal from the sensor, thereby determining a distance to the key container being tampered with.

* * * * *